US011862796B2

(12) United States Patent
Kawasaki et al.

(10) Patent No.: US 11,862,796 B2
(45) Date of Patent: Jan. 2, 2024

(54) POSITIVE-ELECTRODE ACTIVE MATERIAL FOR NON-AQUEOUS ELECTROLYTE SECONDARY BATTERY AND METHOD OF PRODUCING THE SAME

(71) Applicant: NICHIA CORPORATION, Anan (JP)

(72) Inventors: Tomooki Kawasaki, Anan (JP); Kenichi Kobayashi, Tokushima (JP); Takahiro Kitagawa, Tokushima (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 17/652,277

(22) Filed: Feb. 23, 2022

(65) Prior Publication Data

US 2022/0181621 A1 Jun. 9, 2022

Related U.S. Application Data

(62) Division of application No. 15/993,724, filed on May 31, 2018, now Pat. No. 11,296,317.

(30) Foreign Application Priority Data

Jun. 1, 2017 (JP) ................................ 2017-109342

(51) Int. Cl.

*H01M 4/525* (2010.01)
*C01G 53/00* (2006.01)
(Continued)

(52) U.S. Cl.

CPC ............ *H01M 4/525* (2013.01); *C01G 53/54* (2013.01); *H01M 4/505* (2013.01);
(Continued)

(58) Field of Classification Search

CPC ........ C01G 53/54; H01M 4/505; H01M 4/525
See application file for complete search history.

(56) References Cited

U.S. PATENT DOCUMENTS

2011/0244329 A1* 10/2011 Chang ................ C01G 45/1228 977/773
2013/0143091 A1 6/2013 Ueki et al.
(Continued)

FOREIGN PATENT DOCUMENTS

JP 2003272629 A 9/2003
JP 2004349109 A 12/2004
(Continued)

OTHER PUBLICATIONS

Notice of Allowance, United States Patent and Trademark Office, issued to U.S. Appl. No. 15/993,724 dated Nov. 24, 2021, 11 pages.
(Continued)

*Primary Examiner* — Jeremiah R Smith
(74) *Attorney, Agent, or Firm* — Hunton Andrews Kurth LLP

(57) ABSTRACT

A method of producing a positive-electrode active material for a non-aqueous electrolyte secondary battery is provided. The method includes obtaining a precipitate containing nickel and manganese from a solution containing nickel and manganese, heat-treating the resulting precipitate at a temperature of from 850° C. to less than 1100° C. to obtain a first heat-treated product, mixing the first heat-treated product and a lithium compound, and heat-treating the resulting lithium-containing mixture at a temperature of from 550° C. to 1000° C. to obtain a second heat-treated product. The second heat-treated product contains a group of lithium transition metal composite oxide particles having an average particle diameter $D_{SEM}$ of from 0.5 μm to less than 3 μm and $D_{50}/D_{SEM}$ of 1 to 2.5. The lithium transition metal composite oxide particles have a spinel structure based on nickel and manganese.

10 Claims, 6 Drawing Sheets

(51) Int. Cl.
*H01M 4/505* (2010.01)
*H01M 4/02* (2006.01)

(52) U.S. Cl.
CPC ...... *C01P 2002/32* (2013.01); *C01P 2004/03* (2013.01); *C01P 2004/51* (2013.01); *C01P 2004/54* (2013.01); *C01P 2004/61* (2013.01); *C01P 2004/62* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 2014/0034872 | A1 | 2/2014 | Watanabe et al. |
| 2014/0127570 | A1 | 5/2014 | Dandrea |
| 2014/0252268 | A1 | 9/2014 | Kagei et al. |
| 2015/0062779 | A1 | 3/2015 | Bankaitis et al. |
| 2015/0270539 | A1 | 9/2015 | Yoshida |
| 2017/0187031 | A1 | 6/2017 | Kurita et al. |
| 2017/0288221 | A1 | 10/2017 | Kobayashi et al. |
| 2018/0175368 | A1 | 6/2018 | Zhou et al. |
| 2020/0006808 | A1 | 1/2020 | Utsuno et al. |

FOREIGN PATENT DOCUMENTS

| | | | |
|---|---|---|---|
| JP | 2006036545 | A | 2/2006 |
| WO | 2014030764 | A1 | 2/2014 |

OTHER PUBLICATIONS

Non-Final Office Action, United States Patent and Trademark Office, issued to U.S. Appl. No. 15/993,724 dated Apr. 28, 2021, 12 pages.

Advisory Action, United States Patent and Trademark Office, issued to U.S. Appl. No. 15/993,724 dated Jan. 26, 2021, 4 pages.

Non-Final Office Action, United States Patent and Trademark Office, issued to U.S. Appl. No. 15/993,724 dated Oct. 9, 2020, 10 pages.

Non-Final Office Action, United States Patent and Trademark Office, issued to U.S. Appl. No. 15/993,724 dated May 19, 2020, 13 pages.

Restriction Requirement, United States Patent and Trademark Office, issued to U.S. Appl. No. 15/993,724 dated Mar. 9, 2020, 7 pages.

* cited by examiner

POSITIVE-ELECTRODE ACTIVE MATERIAL FOR NON-AQUEOUS ELECTROLYTE SECONDARY BATTERY AND METHOD OF PRODUCING THE SAME

CROSS-REFERENCE TO RELATED APPLICATIONS

This is a divisional application of U.S. patent application Ser. No. 15/993,724, filed May 31, 2018, which claims priority to Japanese Patent Application No. 2017-109342, filed on Jun. 1, 2017, the disclosures of which are hereby incorporated by reference in their entirety.

BACKGROUND

Technical Field

The present invention relates to a positive-electrode active material for a non-aqueous electrolyte secondary battery, and a method of producing the positive-electrode active material for a non-aqueous electrolyte secondary battery.

Description of the Related Art

A positive-electrode active material for a non-aqueous electrolyte secondary battery may be used for large power equipment, such as electric vehicles. Such a positive-electrode active material needs to have both high output characteristics and high durability. To obtain high output characteristics, a positive-electrode active material may include primary particles and secondary particles formed by the aggregation of a large number of the primary particles. The secondary particles may have a hollow structure to achieve a high BET ratio, and the aggregated primary particles forming the secondary particles may have a small size. However, in such a positive-electrode active material, the secondary particles may crack, for example, when subjected to pressure treatment for forming an electrode, or when subjected to, for example, expansion and contraction during charge and discharge. Thus, the durability of the positive-electrode active material needs to be improved.

In response to the above issue, a positive-electrode active material formed from lithium manganate particle powder has been proposed (see, e.g., Japanese Patent Application Publication No. 2003-272629). The powder has an average primary particle diameter of 3 to 20 μm, and an average secondary particle diameter of 2.5 to 40 m. The ratio of the average primary particle diameter to the average secondary particle diameter is 0.5 to 1.2. Also, a spinel lithium-manganese-nickel-containing composite oxide has been proposed (see, e.g., International Patent Publication Application No. WO 2014/030764). In the composite oxide, the ratio of $D_{50}$ in its volume-based cumulative particle size distribution to the average primary particle size determined by observation with a scanning electron microscope (SEM) is 1 to 6.

BRIEF SUMMARY

A method of producing a positive-electrode active material for a non-aqueous electrolyte secondary battery is provided. The method includes obtaining a precipitate containing nickel and manganese from a solution containing nickel and manganese, heat-treating the resulting precipitate at a temperature of from 850° C. to less than 1100° C. to obtain a first heat-treated product, mixing the first heat-treated product and a lithium compound, and heat-treating the resulting lithium-containing mixture at a temperature of from 550° C. to 1000° C. to obtain a second heat-treated product. The second heat-treated product contains lithium transition metal composite oxide particles. The lithium transition metal composite oxide particles have an average particle diameter, $D_{SEM}$ based on SEM observation of from 0.5 μm to less than 3 μm, and the ratio of a particle diameter corresponding to 50% in its volume-based cumulative particle size distribution, or $D_{50}$, to the $D_{SEM}$, or $D_{50}/D_{SEM}$, of 1 to 2.5. The lithium transition metal composite oxide particle has a spinel structure based on nickel and manganese.

DETAILED DESCRIPTION

Figure 1:
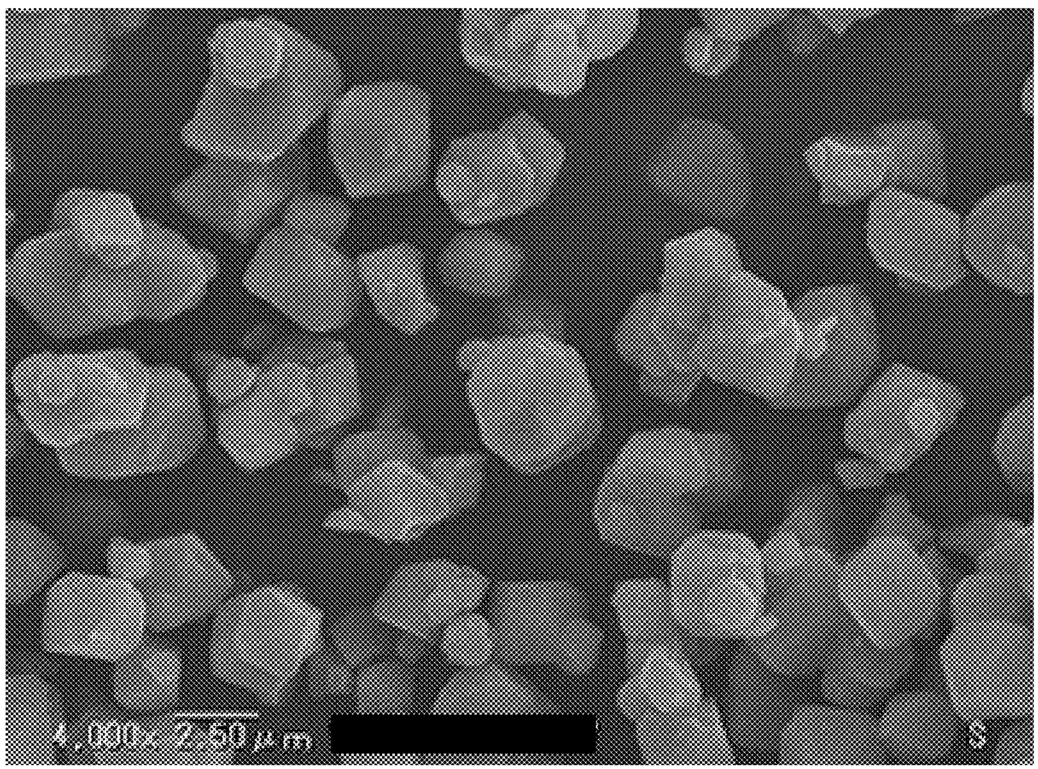
FIG. 1 is an exemplary SEM image of lithium transition metal composite oxide particles according to an embodiment.

Conventional positive-electrode active materials may fail to achieve both sufficiently high durability and sufficiently high output characteristics for a non-aqueous electrolyte secondary battery. One or more aspects of the present disclosure are directed to a positive-electrode active material for a non-aqueous electrolyte secondary battery with both high durability and high output characteristics, and a method of producing the positive-electrode active material.

Specific means for solving the problem are as described below, and the present disclosure includes the aspects described below.

A first aspect is a method of producing a positive-electrode active material for a non-aqueous electrolyte secondary battery, including obtaining a precipitate containing nickel and manganese from a solution containing nickel and manganese, heat-treating the resulting precipitate at a temperature of from 850° C. to less than 1100° C. to obtain a first heat-treated product, mixing the first heat-treated product and a lithium compound, and heat-treating the resulting lithium-containing mixture at a temperature of from 550° C. to 1000° C. to obtain a second heat-treated product. The second heat-treated product contains lithium transition metal composite oxide particles. The lithium transition metal composite oxide particles have an average particle diameter, $D_{SEM}$, based on SEM observation of from 0.5 μm to less than 3 μm, and the ratio of a particle diameter corresponding to 50% in its volume-based cumulative particle size distribution, or $D_{50}$, to the $D_{SEM}$, or $D_{50}/D_{SEM}$, of 1 to 2.5. The lithium transition metal composite oxide particle has a spinel structure based on nickel and manganese.

A second aspect is a positive-electrode active material for a non-aqueous electrolyte secondary battery containing lithium transition metal composite oxide particles. The lithium transition metal composite oxide particles have a $D_{SEM}$ of from 0.5 μm to less than 3 μm, and the ratio of $D_{50}/D_{SEM}$ of from 1 to 2.5, where $D_{SEM}$ is an average particle diameter based on SEM observation and $D_{50}$ is a particle diameter corresponding to 50% in its volume-based cumulative particle size distribution. The lithium transition metal composite oxide particle has a spinel structure based on nickel and manganese.

The embodiments of the present disclosure will now be described. However, the embodiments described below are for embodying the technical concept of the present invention, and the present invention is not limited to the positive-electrode active material for a non-aqueous electrolyte secondary battery and the production method described below. The term "step" as used herein encompasses not only an independent step but also a step in which the anticipated effect of this step is achieved, even if the step cannot be clearly distinguished from another step. For the amount of each component contained in a composition, when a plurality of substances corresponding to the component are present in the composition, the amount of the component means the total amount of the corresponding substances present in the composition unless otherwise specified. The pHs below are measured at 25° C.

Method of Producing Positive-Electrode Active Material for Non-Aqueous Electrolyte Secondary Battery The method of producing a positive-electrode active material for a non-aqueous electrolyte secondary battery according to the present embodiment comprises obtaining a precipitate containing nickel and manganese from a solution containing nickel and manganese (hereinafter also referred to as "precipitate generation step"), heat-treating the resulting precipitate at a temperature of from 850° C. to less than 1100° C. to obtain a first heat-treated product (hereinafter also referred to as "first heat treating step"), mixing the first heat-treated product and a lithium compound, and heat-treating the resulting lithium-containing mixture at a temperature of from 550° C. to 1000° C. to obtain a second heat-treated product (hereinafter also referred to as "second heat treating step"). The second heat-treated product contains a lithium transition metal composite oxide particles. The lithium transition metal composite oxide particles have a $D_{SEM}$ of from 0.5 μm to less than 3 μm, and a ratio of $D_{50}/D_{SEM}$ of 1 to 2.5, where $D_{SEM}$ is an average particle diameter based on SEM observation and $D_{50}$ is a particle diameter corresponding to 50% in its volume-based cumulative particle size distribution. The lithium transition metal composite oxide particle has a spinel structure based on nickel and manganese.

The second heat-treated product containing lithium transition metal composite oxide particles is produced by heat-treating a precipitate containing nickel and manganese at a specific temperature to obtain the first heat-treated product, and then heat-treating a mixture containing the first heat-treated product and a lithium compound at a specific temperature. This enables effective production of lithium transition metal composite oxide particles having an average particle diameter based on SEM observation, $D_{SEM}$, of 0.5 μm to less than 3 μm, which is smaller than the average particle diameters of conventional products, and a ratio of $D_{50}/D_{SEM}$ of 1 to 2.5, where $D_{50}$ is a particle diameter corresponding to 50% in its volume-based cumulative particle size distribution, with one or a few primary particles. The precipitate containing nickel and manganese is formed from secondary particles as an aggregate of a plurality of primary particles. Heat-treating the precipitate allows the particles to be sintered together. This results in composite oxide particles containing secondary particles with a decreased number of primary particles, or primary particles with a larger-size. In the present embodiment, setting the heat-treating temperature in the first heat-treating step to a specific range produces composite oxide particles containing primary particles with a size suitable for obtaining lithium transition metal composite oxide particles having an intended average particle diameter. The composite hydroxide particles obtained in the first heat-treating step seemingly have a weak sintering degree among the particles. This may allow, when lithium transition metal composite oxide particles are formed, the resulting second heat-treated product to have an improved disintegratability and a ratio of $D_{50}/D_{SEM}$ in a specific range.

The lithium transition metal composite oxide particles according to the present embodiment have a smaller contact particle boundary area among primary particles, and a uniform particle diameter. Thus, when pressed at a high pressure to form an electrode, the particles are believed to be less broken. This seemingly allows the voids between the particles to be uniform. To form a secondary battery, an electrolyte is filled in the voids among the particles to form a diffusion path for lithium ions. The diffusion paths having a uniform size can reduce variation among particles during charge and discharge. This is believed to allow the lithium transition metal composite oxide particles having a smaller contact particle boundary area among primary particles to have high output characteristics along with high polar plate filling property. Also, a smaller contact particle boundary area is believed to help reduce breakage of the particles during charge and discharge cycles and achieve high durability.

An average particle diameter, $D_{SEM}$, based on SEM observation is obtained by selecting 100 particles with recognizable outlines in an image obtained by an SEM at a magnification of 1000 to 10000 in accordance with the particle diameter, calculating the sphere equivalent diameters of the selected particles using image processing software, and obtaining an arithmetic mean value of the resulting sphere equivalent diameters. Further, a 50% particle diameter, $D_{50}$ is obtained as a particle diameter corresponding to a cumulative 50% from the small diameter side in its volume-based cumulative particle size distribution measured using a laser diffraction particle size analyzer under a wet condition. In the same manner, the later-described 95% particle diameter, $D_{95}$, 90% particle diameter, $D_{90}$, 10% particle diameter, $D_{10}$, and 5% particle diameter, $D_5$ are particle diameters corresponding respectively to cumulative 95%, cumulative 90%, cumulative 10%, and cumulative 5% from the small diameter side.

Precipitate Generation Step

In the precipitate generation step, a precipitate containing nickel and manganese is obtained from a solution containing nickel and manganese using a coprecipitation method. The precipitate obtained in the precipitate generation step preferably contains at least one selected from the group consisting of composite hydroxide composite and carbonate containing nickel and manganese in an intended ratio. The precipitate generation step may include, for example, a seed generation step and a crystallization step. For the precipitate generation step, for example, one may refer to Japanese Patent Application Publication No. 2003-292322, and Japanese Patent Application Publication No. 2011-116580.

In the seed generation step, a liquid medium containing a seed crystal can be prepared by adjusting the pH of a mixture solution containing nickel ions and manganese ions in an intended ratio to, for example, 11 to 13. The seed crystal can, for example, include hydroxide particles containing nickel and manganese in an intended ratio. The mixture solution can be prepared by dissolving a nickel salt and a manganese salt in water in an intended ratio. Examples of the nickel salt and the manganese salt may include sulfate, nitrate, and hydrochloride. The mixture solution may contain other metal salts in addition to the nickel salt and the manganese salt as appropriate. The seed generation step can be carried out at a temperature of, for example, from 40° C. to 80° C. The seed generation step can be carried out in a low oxidizing atmosphere, and, for example, preferably maintains the oxygen concentration at 10% by volume or less.

In the crystallization step, the generated seed crystal is allowed to grow to form a precipitate as particles containing nickel and manganese with intended characteristics. The seed crystal can be grown by, for example, adding a mixture solution containing nickel ions and manganese ions to a liquid medium containing the seed crystal while maintaining the pH at, for example, from 7 to 12, and preferably from 7.5 to 11.5. The mixture solution may be added in a time period of, for example, 1 to 24 hours, and preferably 3 to 18 hours. The crystallization step can be carried out at a temperature of, for example, from 40° C. to 80° C. The crystallization step can be carried out in the same atmosphere as that in the seed generation step.

In the precipitate generation step, the pH may be adjusted using, for example, an acidic aqueous solution, such as a sulfuric acid aqueous solution or a nitric acid aqueous solution; or an alkaline aqueous solution, such as an aqueous sodium hydroxide solution or an aqueous ammonia.

In addition to adjusting the pH, carbonic acid may be introduced in the precipitate generation step. Introducing carbonic acid produces carbonate containing nickel and manganese having a smaller primary size as a precipitate. Thus, a second heat-treated product with a smaller $D_{SEM}$ can be more easily obtained. Carbonic acid may be introduced, for example, by introducing carbonic acid gas, or by adding carbonate or an aqueous solution of carbonate. Carbonic acid may be introduced in an amount appropriately selected in accordance with the amount of the target precipitate.

The crystallization step is preferably carried out in a manner to allow the precipitate containing nickel and manganese to have an average particle diameter in an intended range. The precipitate has an average particle diameter of, for example, 0.1 μm or more, and preferably 1 μm or more. Also, the precipitate has an average particle diameter of, for example, 10 μm or less, and preferably 6 μm or less. The average particle diameter of the precipitate is determined as $D_{50}$ corresponding to cumulative 50% point from the small diameter side in its volume-based cumulative particle size distribution.

First Heat-Treating Step

In the first heat-treating step, the precipitate obtained in the precipitate generation step is heat-treated at a temperature of from 850° C. to less than 1100° C. to obtain a first heat-treated product. The precipitate is heat-treated preferably at a temperature of 900° C. or more, or 950° C. or more. Also, the precipitate is heat-treated preferably at a temperature of 1080° C. or less, or 1060° C. or less. Heat-treating the precipitate in this range can yield composite oxide particles suitable for producing lithium transition metal composite oxide particles.

The heat-treating can be carried out, for example, by increasing the temperature from room temperature to a predetermined temperature, and then maintaining the temperature for a predetermined time period. The temperature may be increased to the predetermined temperature at an increase rate of, for example 1.5° C./min to 10° C./min.

The heat-treating in the first heat-treating step is carried out in a time period of, for example, from 0.5 hour or more, and preferably 5 hours or more, and also, for example, 72 hours or less, and preferably 48 hours or less. The heat-treating can be carried out, for example, in an air atmosphere. The first heat-treating step can be carried out using, for example, a box furnace, a rotary kiln furnace, a pusher furnace, or a roller hearth kiln furnace.

The precipitate to be subjected to the first heat-treating step may undergo dry treatment before the heat-treating step. The dry treatment is to remove at least a part of moisture contained in the precipitate, and preferably reduces the moisture content of the precipitate to 10% by weight or less. The dry treatment is carried out by, for example, heating at a temperature of less than 850° C., preferably at 500° C. or less, and more preferably at 350° C. or less. Also, the dry treatment may be carried out at a temperature of, for example, at 100° C. or more, and preferably at 200° C. or more. The dry treatment may be carried out in a time period of, for example, from 0.5 hour to 48 hours, and preferably from 5 hours to 24 hours. The dry treatment may be carried out, for example, in an air atmosphere, or may be carried out under reduced pressure.

The first heat-treated product obtained through the heat-treating may further undergo, for example, cracking treatment, dissociating treatment, or classifying treatment as appropriate. If the first heat-treated product undergoes at least dissociating treatment, lithium transition metal composite oxide particles having, for example, an intended particle size distribution can more efficiently be produced. Dissociating treatment, if carried out, is preferably carried out in a manner not to pulverize primary particles forming the composite oxide particles in the first heat-treated product. Dissociating treatment can be carried out using, for example, a jet mill, a resin ball mill, a roller mill, a pin mill, or a planetary mill. If carried out with a jet mill, dissociating treatment can be carried out under the dissociating conditions of a supply pressure of from 0.1 MPa to 0.6 MPa, and a dissociating pressure of from 0.1 MPa to 0.6 MPa. If classifying treatment is carried out, for example, a dry sieve with an intended opening can be used.

The first heat-treated product contains, for example, composite oxide particles containing nickel and manganese. The composite oxide particles have a $D_{50}$ of, for example, from 1 μm to 5 μm, and preferably from 1.1 μm to 4 μm. Also, a particle diameter, $D_{10}$ corresponding to 10%, is, for example, from 0.5 μm to 3 μm, and preferably from 0.6 μm to 2 μm and a particle diameter, $D_{90}$, corresponding to 90% in its volume-based cumulative particle size distribution is, for example, from 2 μm to 7 μm, and preferably from 2.1 μm to 5 μm. The ratio of $D_{90}/D_{10}$ shows the breadth of the particle size distribution, and the smaller the value, the more uniform the particle diameter is. $D_{90}/D_{10}$ is, for example, 3 or less, and preferably 2.5 or less. With composite oxide particles having a particle size distribution in this range, lithium transition metal composite oxide particles with improved characteristics can more efficiently be produced. The lower limit of $D_{90}/D_{10}$ is, for example, 1.2 or more.

Second Heat-Treating Step

In the second heat-treating step, the first heat-treated product and a lithium compound are mixed, and the resulting lithium-containing mixture (hereinafter also referred to as "first mixture") is heat-treated at a temperature of from 550° C. to 1000° C. to obtain a second heat-treated product. The second heat-treated product contains lithium transition metal composite oxide particles. The lithium transition metal composite oxide particles have a $D_{SEM}$ of from 0.5 μm to less than 3 μm, and a $D_{50}/D_{SEM}$ of from 1 to 2.5. The lithium transition metal composite oxide particle has a spinel structure based on nickel and manganese. A non-aqueous electrolyte secondary battery including a positive-electrode active material for a non-aqueous electrolyte secondary battery containing lithium transition metal composite oxide particles with such specific particle characteristics can achieve both high durability and high output characteristics.

Examples of the lithium compound to be mixed with the first heat-treated product include lithium hydroxide, lithium carbonate, and lithium oxide. The lithium compound to be mixed has a $D_{50}$ of, for example, from 0.1 μm to 100 μm, and preferably from 2 μm to 20 μm.

The ratio of the total number of moles of lithium to the total number of moles of metal elements included in the first heat-treated product in the first mixture is, for example, from 0.5 to 0.65, and preferably from 0.55 to 0.63. The first heat-treated product and the lithium compound can be mixed using, for example, a high-speed shearing mixer.

The first mixture may further contain other metals in addition to lithium, nickel, and manganese. Examples of the other metals include Al, Mg, Si, Ti, Cr, Fe, Co, Cu, Zn, Ga, and Nb, and at least one selected from the group consisting of these is preferable, and at least one selected from the group consisting of Al, Ti, Cr, Fe, and Co is more preferable. When the first mixture contains other metals, a simple metal or a metal compound of other metals is mixed together with the first heat-treated product and a lithium compound to obtain the first mixture. Examples of the metal compounds containing other metals include oxide, hydroxide, chloride, nitride, carbonate, sulfate, nitrate, acetate, and oxalate.

When the first mixture contains other metals, the ratio of the total number of moles of the metal elements forming the first heat-treated product to the total number of moles of other metal elements included in the first heat-treated product is, for example, from 1:0.015 to 1:0.1, and preferably from 1:0.025 to 1:0.05.

The first mixture is heat-treated at a temperature of from 550° C. to 1000° C., preferably from 600° C. or more 950° C., and more preferably from 750° C. to 950° C. Although the lithium-containing mixture may be heat-treated at a single temperature, the mixture is preferably heated at multiple temperatures in consideration of the electric discharge volume at a high voltage. When heat-treated at multiple temperatures, the mixture can be heat-treated at a temperature of, for example, from 750° C. to 1000° C., and then at a temperature of from 550° C. to less than 750° C. The mixture may be heat-treated, for example, from 0.5 hour to 48 hours. When heat-treated at multiple temperatures, each heating can last from 0.2 hour to 47 hours.

The heat-treating may be carried out in an air atmosphere, or an oxygen-containing atmosphere. The heat-treating may be carried out using, for example, a box furnace, a rotary kiln furnace, a pusher furnace, or a roller hearth kiln furnace.

The second heat-treated product obtained through the heat-treating may further undergo, for example, cracking treatment, dissociating treatment, or classifying treatment as appropriate. This enables intended lithium transition metal composite oxide particles to be obtained. Dissociating treatment, if carried out, is preferably carried out in a manner not to pulverize primary particles forming the lithium transition metal composite oxide particles contained in the second heat-treated product. Dissociating treatment can be carried out using, for example, a jet mill, a resin ball mill, a roller mill, a pin mill, or a planetary mill. If carried out with a jet mill, dissociating treatment can be carried out under the dissociating conditions of a supply pressure of from 0.1 MPa to 0.6 MPa, and a dissociating pressure of from 0.1 MPa to 0.6 MPa. If classifying treatment is carried out, for example, a dry sieve with an intended opening can be used.

The second heat-treated product contains lithium transition metal composite oxide particles having a $D_{SEM}$ of from 0.5 μm to less than 3 μm. For improved output characteristics, the particles preferably have a $D_{SEM}$ of from 0.7 μm to 2.5 μm, and more preferably from 1 μm to 2 μm. The ratio of $D_{50}/D_{SEM}$ is from 1 to 2.5. $D_{50}/D_{SEM}$ being 1 indicates that the particles are formed from single particles, and the closer to 1, the smaller the number of the primary particles is. $D_{50}/D_{SEM}$ is preferably 2 or less for improved durability. The ratio of $D_{95}/D_5$ indicates the breadth of the particle size distribution. The smaller the value, the more uniform the particle diameter of the particle is. The ratio of $D_{95}/D_5$ is preferably 4 or less, and more preferably 3 or less. The lower limit of the ratio of $D_{95}/D_5$ is, for example, 1.1 or more. Further, the ratio of $D_{90}/D_{10}$ is preferably 2.5 or less, and more preferably 2.3 or less. The lower limit of the ratio of $D_{90}/D_{10}$ is for example, 1.1 or more.

With the ratio of $D_{95}/D_5$ and/or the ratio of $D_{90}/D_{10}$ being in a specific range, the lithium transition metal composite oxide particles have a uniform particle size. Thus, the lithium transition metal composite oxide particles have less variation among particles in the depth of charge and discharge due to current concentration on a part of the particles even when the cycle is carried out at a high current density. Thus, the particles are seemingly less locally deteriorated during charge-discharge cycles with resistance growth due to current concentration being suppressed.

Niobium Adhesion Step

A method of producing a positive-electrode active material for a non-aqueous electrolyte secondary battery according to the present embodiment may further include mixing the second heat-treated product or the second heat-treated product in a dispersed state (hereinafter also simply collectively referred to as "second heat-treated product"), and simple niobium or a niobium compound, and heat-treating the resulting niobium-containing mixture (hereinafter also referred to as "second mixture"). This allows a substance containing niobium to adhere to the surfaces of lithium transition metal composite oxide particles contained in the second heat-treated product. A non-aqueous electrolyte secondary battery including the positive-electrode active material for a non-aqueous electrolyte secondary battery containing lithium transition metal composite oxide particles to which a substance containing niobium is adhered can achieve further improved durability.

Examples of the niobium compound to be contained in the second mixture include niobium oxide, niobium chloride, niobium nitride, niobium carbide, niobium oxalate, and niobium alkoxide. Simple niobium or the niobium compound to be mixed has a particle diameter, $D_{50}$ of, for example, from 0.001 μm to 1 μm, and preferably from 0.005 μm to 0.1 μm. The mixing ratio of niobium, as a metal niobium, to the lithium transition metal composite oxide in the second mixture is, for example, from 0.1% by mol to 3% by mol, and preferably from 0.5% by mol to 2% by mol.

The second heat-treated product and simple niobium or the niobium compound can be mixed, for example, by adding a dispersed substance containing niobium to the second heat-treated product while stirring the second heat-treated product with a mixer.

The resulting second mixture is heat-treated to obtain a third heat-treated product containing lithium transition metal composite oxide particles to which the niobium-containing substance is adhered. The second mixture is heat-treated at a temperature of, for example, from 300° C. to 800° C., and preferably from 350° C. to 700° C. The second mixture is heat-treated in a time period of, for example, from 0.5 hour to 48 hours. The second mixture is heat-treated in an air atmosphere or an oxygen-containing atmosphere. The second mixture is heat-treated using, for example, a box furnace, a rotary kiln furnace, a pusher furnace, or a roller hearth kiln furnace. The third heat-treated product obtained through the heat-treating may undergo, for example, cracking treatment, dissociating treatment, or classifying treatment as appropriate.

In the present embodiment, the lithium transition metal composite oxide included in the lithium transition metal composite oxide particles in the second heat-treated product has a spinel structure based on nickel and manganese, and preferably has a composition represented by the formula below:

$$Li_xNi_pMn_qM^1_rO_4$$

In the formula, x, p, q, and r satisfy $1 \leq x \leq 1.3$, $0.3 \leq p \leq 0.6$, $1.2 \leq q \leq 1.7$, $0 \leq r \leq 0.2$, and $p+q+r \leq 2$, and $M^1$ is at least one selected from the group consisting of Al, Mg, Si, Ti, Cr, Fe, Co, Cu, Zn, Ga, and Nb.

The lithium transition metal composite oxide having this specific composition can produce a non-aqueous electrolyte secondary battery with further improved durability and output characteristics.

Positive-Electrode Active Material for Non-Aqueous Electrolyte Secondary Battery The positive-electrode active material for a non-aqueous electrolyte secondary battery according to the present embodiment (hereinafter also simply referred to as "the positive-electrode active material") contains lithium transition metal composite oxide particles having a $D_{SEM}$ of 0.5 μm to less than 3 μm, and a ratio of $D_{50}/D_{SEM}$ of from 1 to 2.5. The lithium transition metal composite oxide particles preferably have a $D_{SEM}$ of from 1 μm to 2 μm, and a ratio of $D_{50}/D_{SEM}$ of preferably from 1 to 2. A non-aqueous electrolyte secondary battery including the positive-electrode active material containing lithium transition metal composite oxide particles having those specific particle characteristics can achieve durability and output characteristics both at a high level The lithium transition metal composite oxide particles contained in the positive-electrode active material have a ratio of $D_{95}/D_5$ of preferably 4 or less, and more preferably 3 or less. The lower limit of the ratio of $D_{95}/D_5$ is, for example, from 1.1 or more. The lithium transition metal composite oxide particles also have a ratio of $D_{90}/D_{10}$ of 2.5 or less, and more preferably 2.3 or less. The lower limit of the ratio of $D_{90}/D_{10}$ is, for example, 1.1 or more.

The lithium transition metal composite oxide particles having a ratio of $D_{95}/D_5$ and/or a ratio of $D_{90}/D_{10}$ within the specific range have a uniform particle size. Thus, the lithium transition metal composite oxide particles have less variation among particles in the depth of charge and discharge due to partial current concentration even when the cycle is carried out with a high current density. Thus, the particles are less locally deteriorated during charge-discharge cycles with resistance growth due to current concentration being suppressed.

The lithium transition metal composite oxide particles contained in the positive-electrode active material preferably contain lithium transition metal composite oxide particles onto the surfaces of which a substance containing niobium is attached. A non-aqueous electrolyte secondary battery including that positive-electrode active material can achieve further improved durability.

The lithium transition metal composite oxide included in the lithium transition metal composite oxide particles contained in the positive-electrode active material has a spinel structure based on nickel and manganese, and preferably has a composition represented by the formula below:

$$Li_xNi_pMn_qM^1_rO_4$$

In the formula, x, p, q, and r satisfy $1 \leq x \leq 1.3$, $0.3 \leq p \leq 0.6$, $1.2 \leq q \leq 1.7$, $0 \leq r \leq 0.2$, and $p+q+r \leq 2$, and $M^1$ is at least one selected from the group consisting of Al, Mg, Si, Ti, Cr, Fe, Co, Cu, Zn, Ga, and Nb.

The positive-electrode active material according to the present embodiment can be produced by, for example, the method described above.

Electrode for Non-Aqueous Electrolyte Secondary Battery

An electrode for a non-aqueous electrolyte secondary battery includes a current collector, and a positive-electrode active material layer containing a positive-electrode active material for a non-aqueous electrolyte secondary battery produced by the above-described method and arranged on the current collector. A non-aqueous electrolyte secondary battery containing such an electrode can achieve both high durability and high output characteristics.

Examples of the material for the current collector include aluminum, nickel, and stainless steel. The positive-electrode active material layer can be formed by mixing the positive-electrode active material, a conductive material, and a binder with a solvent to obtain a positive electrode mixture, and applying the positive electrode mixture on the current collector, and subjecting the layer to, for example, dry treatment and pressure treatment. Examples of the conductive material include natural graphite, artificial graphite, and acetylene black. Examples of the binder include polyvinylidene fluoride, polytetrafluoroethylene, and polyamide acryl resin.

Non-Aqueous Electrolyte Secondary Battery

The non-aqueous electrolyte secondary battery includes the positive electrode for a non-aqueous electrolyte secondary battery. In addition to the positive electrode for a non-aqueous electrolyte secondary battery, the non-aqueous electrolyte secondary battery mainly includes a negative electrode for a non-aqueous secondary battery, the non-aqueous electrolyte, and a separator. For the negative electrode, the non-aqueous electrolyte, and the separator in a non-aqueous electrolyte secondary battery, those described for a non-aqueous secondary battery in, for example, Japanese Patent Application Publication No. 2002-075367, Japanese Patent Application Publication No. 2011-146390, and Japanese Patent Application Publication No. 2006-012433, which three Japanese Patent Application Publications are incorporated herein in their entirety by reference, can be used as appropriate.

EXAMPLES

The present invention will now be described in detail with reference to examples, but the present invention is not limited to these examples.

The method of determining physical properties in examples and comparative examples below will now be described.

The volume-based cumulative particle size distribution of particles was measured using a laser diffraction particle size analyzer (SALD-3100 by Shimadzu), and the particle diameters $D_5$, $D_{10}$, $D_{50}$, $D_{90}$, and $D_{95}$ were determined as particle diameters corresponding to cumulative 5%, 10%, 50%, 90% and 95% from the small diameter side of the volume-based cumulative particle size distribution.

The average particle diameter, $D_{SEM}$, based on SEM observation is obtained by selecting 100 particles with recognizable outlines in an image obtained by an SEM at a magnification of 1000 to 10000, calculating the sphere equivalent diameters of the selected particles using image processing software (ImageJ), and obtaining an arithmetic mean value of the resulting sphere equivalent diameters. $D_5$, $D_{10}$, $D_{50}$, $D_{90}$, $D_{95}$ and $D_{SEM}$ are hereinafter also collectively referred to as, for example, the average particle diameters.

Example 1

Seed Generation Step

Into a reaction vessel, 30 kg of water was charged, nitrogen gas was passed through the water with stirring, and the temperature within the vessel was set to 50° C. The oxygen concentration in the space within the vessel was maintained to 10% by volume or less, and then 197 g of a 25% by mol aqueous solution of sodium hydroxide was added to adjust the pH of the solution in the reaction vessel to 11 or more. A nickel sulfate solution and a manganese sulfate solution were then mixed, and the aqueous mixture solution was adjusted to have nickel and manganese at a molar ratio of 25:75, and the total concentration of nickel and manganese ion is 1.7 mol/L.

To the solution in the reaction vessel, 4.76 L of the aqueous mixture solution was added while stirring the mixture solution to obtain a liquid medium containing a seed crystal.

Crystallization Step

After the seed generation step, 70% sulfuric acid was added to adjust the pH to 8.9 to 9.2 while the temperature was maintained at 50° C. Subsequently, 452 moles of 25% by mass sodium hydroxide and 201 moles of the aqueous mixture solution were added into the reaction vessel each at a constant rate for 18 hours or more. The pH at this time was maintained to 7.5 to 8.5. After completion of the addition, 2.1 kg of a 25% by mass aqueous solution of sodium hydroxide was added with the reaction vessel being maintained at 50° C. The pH at this time in the reaction vessel was 11.7. The resultant nickel-manganese-containing hydroxide had a $D_{50}$ of 6.0 μm.

The generated precipitate was then washed with water and filtered to obtain composite hydroxide particles. The composite hydroxide particles were subjected to dry treatment in an air atmosphere at 300° C. for 12 hours to obtain composite oxide particles having a composition ratio of Ni/Mn=0.25/0.75, $D_{10}$=4.5 μm, $D_{50}$=5.9 μm, $D_{90}$=7.9 μm, and $D_{90}/D_{10}$=1.8.

First Heat-Treating Step

The resultant composite oxide particles were heat-treated in an air atmosphere at 1000° C. for 6 hours to have a sintered composite oxide. The sintered composite oxide was disintegrated, subjected once to dissociating treatment using a jet mill adjusted to a supply pressure of 0.55 MPa and a dissociating pressure of 0.55 MPa, and dry-sieved to obtain a first heat-treated product with $D_{10}$=2.4 μm, $D_{50}$=3.5 μm, $D_{90}$=5.3 μm, and $D_{90}/D_{10}$=2.2.

Second Heat-Treating Step

The resultant first heat-treated product and lithium carbonate were mixed in a manner to have a ratio of Li:(Ni+Mn)=1.1:2 to obtain a first mixture, or a raw material mixture. The raw material mixture was heat-treated in an air atmosphere at 835° C. for 11 hours, and then at 600° C. for 4 hours to obtain a sintered body. The sintered body was disintegrated, subjected once to dissociating treatment using a jet mill adjusted to a supply pressure of 0.2 MPa and a dissociating pressure of 0.2 MPa so as not to pulverize its primary particles, and dry-sieved to obtain a second heat-treated product as powder.

As described above, lithium transition metal composite oxide particles having a composition represented by the formula: $Li_{1.1}Ni_{0.5}Mn_{1.5}O_4$, a $D_{SEM}$ of 2.4 μm, a $D_5$ of 2.5 μm, a $D_{10}$ of 2.7 μm, a $D_{50}$ of 3.8 μm, a $D_{90}$ of 5.4 μm, and a $D_{95}$ of 6.3 μm, a ratio of $D_{50}/D_{SEM}$ of 1.6, $D_{90}/D_{10}$ of 2, and $D_{95}/D_5$ of 2.5 were obtained. The physical properties of the lithium transition metal composite oxide particles are shown in Table 1, and an SEM image is shown in FIG. 1.

Comparative Example 1

Under the same conditions as in Example 1 up to the crystallization step, composite oxide particles were obtained. The composite oxide particles were mixed with lithium carbonate in a manner to have a ratio of Li:(Ni+Mn)=1.1:2, without subjecting them to the first heat-treating step, to obtain a raw material mixture. The raw material mixture was heat-treated in an air atmosphere at 850° C. for 11 hours, and then at 600° C. for 4 hours to obtain a sintered body. The sintered body was disintegrated, and subjected to dissociating treatment for 10 min using a resin ball mill, and dry-sieved to obtain powder.

Figure 2:
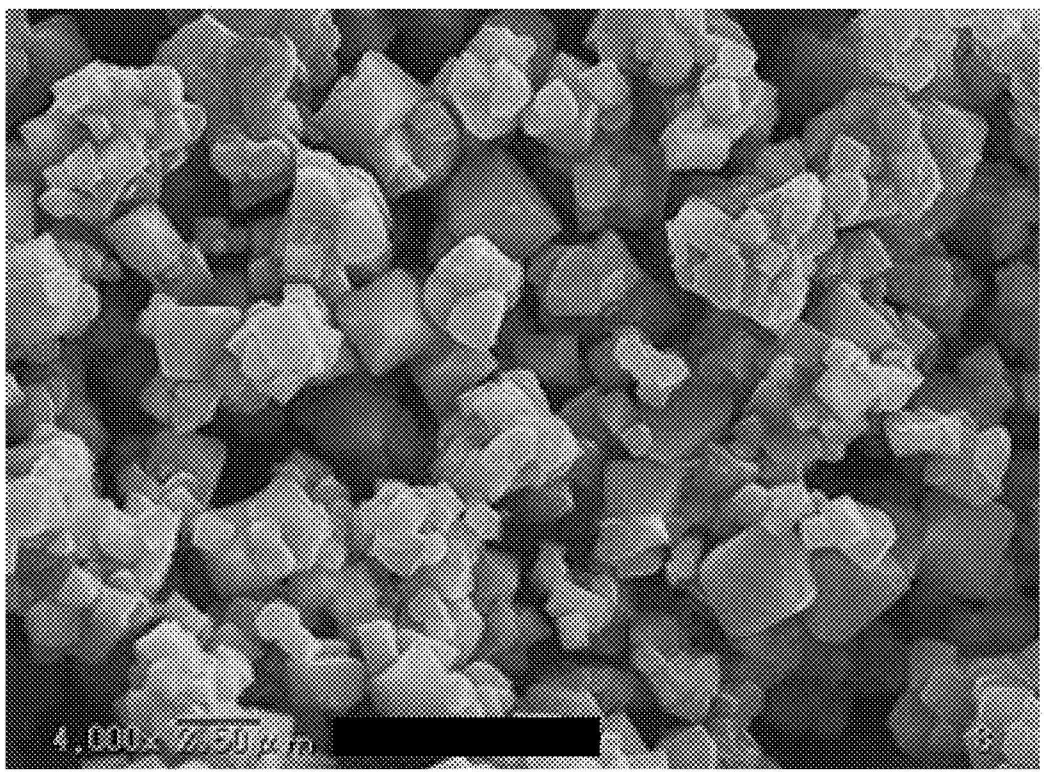
FIG. 2 is an exemplary SEM image of lithium transition metal composite oxide particles according to a comparative example.

As described above, lithium transition metal composite oxide particles having a composition represented by the formula: $Li_{1.1}Ni_{0.5}Mn_{1.5}O_4$ and having a $D_{SEM}$ of 1.5 μm, a $D_5$ of 2.8 μm, a $D_{10}$ of 3.4 μm, a $D_{50}$ of 6.2 μm, a $D_{90}$ of 10.5 μm, and a $D_{95}$ of 13.7 μm, a ratio of $D_{50}/D_{SEM}$ of 4.2, a $D_{90}/D_{10}$ of 3.1, and a $D_{95}/D_5$ of 4.9 were obtained. The physical properties of the lithium transition metal composite oxide particles are shown in Table 1, and an SEM image is shown in FIG. 2.

Example 2

Under the same conditions as in Example 1 up to the crystallization step except that the molar ratio of nickel and manganese in the aqueous mixture solution was changed to 26:74, composite oxide particles having a composition ratio of Ni/Mn of 0.26/0.74, a $D_{10}$ of 4.6 μm, a $D_{50}$ of 6 μm, a $D_{90}$ of 8 μm, and a $D_{90}/D_{10}$ of 1.7 were obtained. The composite oxide particles were heat-treated in an air atmosphere at 975° C. for 6 hours to obtain a sintered body. The sintered body was disintegrated, subjected once to dissociating treatment using a jet mill adjusted to a supply pressure of 0.55 MPa and a dissociating pressure of 0.55 MPa, and dry-sieved to obtain a first heat-treated product with $D_{10}$=2.5 μm, $D_{50}$=4 μm, $D_{90}$=6.8 μm, and $D_{90}/D_{10}$=2.7. The resultant first heat-treated product, lithium carbonate, and titanium oxide were mixed in a manner to have a ratio of Li:(Ni+Mn):Ti=1.2:1.925:0.075 to obtain a first mixture. The first mixture was heat-treated in an air atmosphere at 835° C. for 11 hours, and then at 600° C. for 4 hours to obtain a sintered body. The sintered body was disintegrated, subjected once to dissociating treatment using a jet mill adjusted to a supply pressure of 0.2 MPa and a dissociating pressure of 0.2 MPa so as not to pulverize its primary particles, and dry-sieved to obtain a second heat-treated product as powder.

Figure 3:
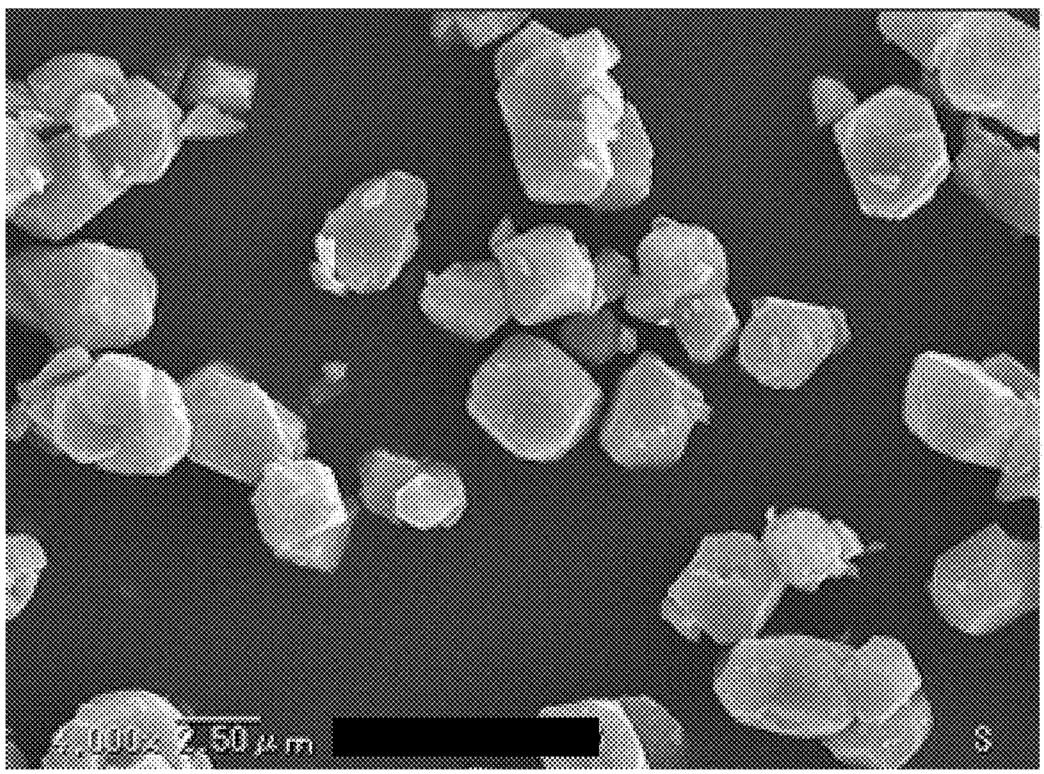
FIG. 3 is an exemplary SEM image of lithium transition metal composite oxide particles according to an embodiment.

As described above, lithium transition metal composite oxide particles having a composition represented by the formula: $Li_{1.2}Ni_{0.5}Mn_{1.425}Ti_{0.075}O_4$ and having a $D_{SEM}$ of 2.6 μm, a $D_5$ of 2.3 μm, a $D_{10}$ of 2.7 μm, a $D_{50}$ of 4.2 μm, a $D_{90}$ of 6 μm, and a $D_{95}$ of 6.4 μm, a ratio of $D_{50}/D_{SEM}$ of 1.6, a ratio of $D_{90}/D_{10}$ of 2.2, and a ratio of $D_{95}/D_5$ of 2.8 were obtained. The physical properties of the lithium transition metal composite oxide particles are shown in Table 1, and an SEM image is shown in FIG. 3.

Comparative Example 2

Under the same conditions as in Example 2 up to the crystallization step, composite oxide particles were obtained. The composite oxide particles were mixed with lithium carbonate and titanium oxide in a manner to have a ratio of Li:(Ni+Mn):Ti=1.2:1.925:0.075 without subjected to the first heat-treating step to obtain a raw material mixture. The raw material mixture was heat-treated in an air atmosphere at 850° C. for 11 hours, and then at 600° C. for 4 hours to obtain a sintered body. The sintered body was disintegrated, subjected to dissociating treatment in a resin ball mill for 15 min, and dry-sieved to obtain powder.

Figure 4:
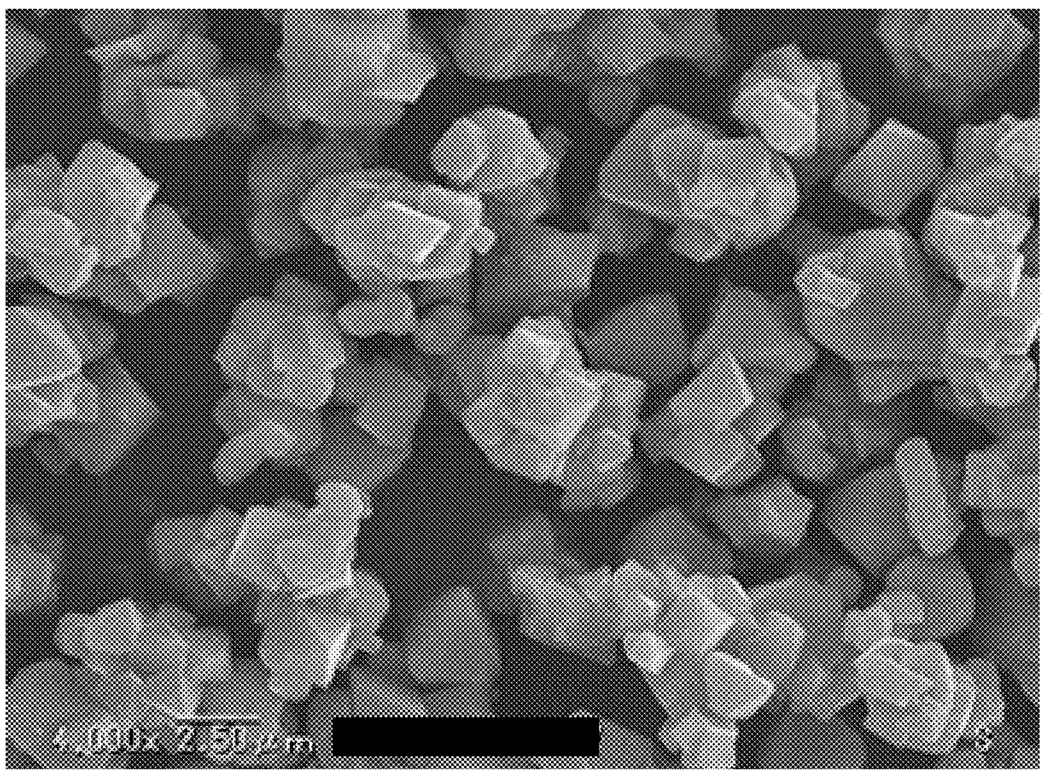
FIG. 4 is an exemplary SEM image of lithium transition metal composite oxide particles according to a comparative example.

As described above, lithium transition metal composite oxide particles having a composition represented by the formula: $Li_{1.2}Ni_{0.5}Mn_{1.425}Ti_{0.075}O_4$, and having a $D_{SEM}$ of 1.9 μm, a $D_5$ of 2.8 μm, a $D_{10}$ of 3.4 μm, a $D_{50}$ of 6.1 μm, a $D_{90}$ of 9.8 μm, and a $D_{95}$ of 12.4 μm, a ratio of $D_{50}/D_{SEM}$ of 3.3, a ratio of $D_{90}/D_{10}$ of 2.9, and a ratio of $D_{95}/D_5$ of 4.5 were obtained. The physical properties of the lithium transition metal composite oxide particles are shown in Table 1, and an SEM image is shown in FIG. 4.

Comparative Example 3

Under the same conditions as in Comparative Example 2, a sintered body was obtained. The sintered body was disintegrated, subjected once to dissociating treatment using, instead of a resin ball mill, a jet mill adjusted to a supply pressure of 0.55 MPa and a dissociating pressure of 0.55 MPa, and dry-sieved to obtain powder.

Figure 5:
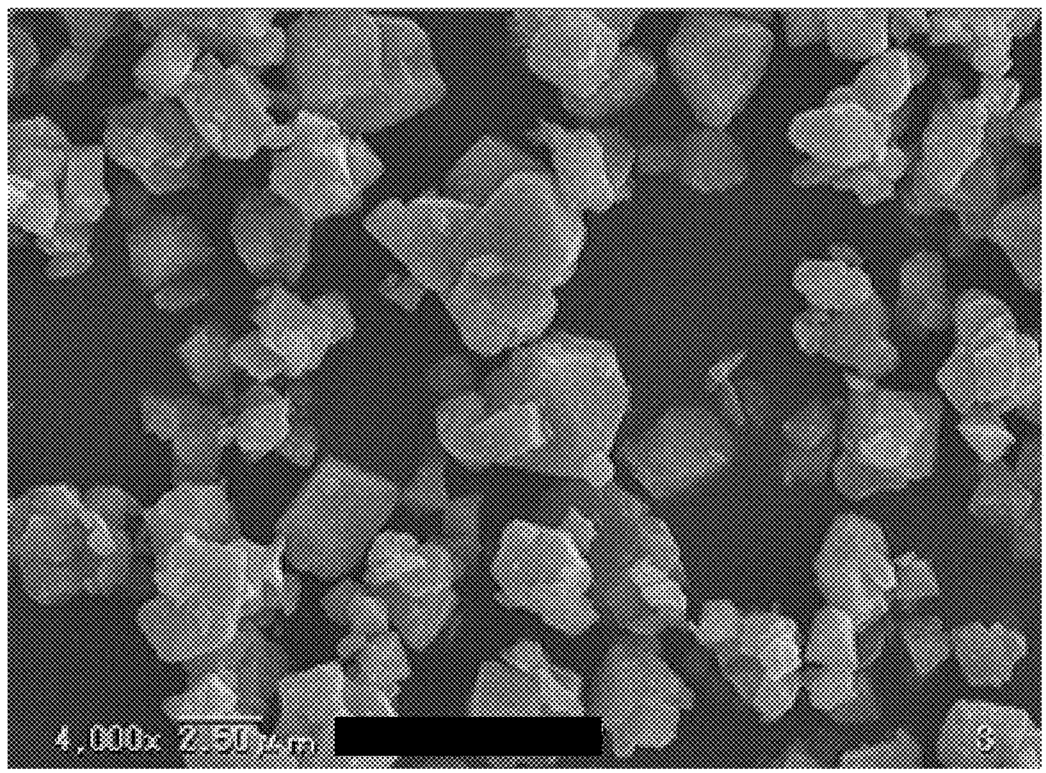
FIG. 5 is an exemplary SEM image of lithium transition metal composite oxide particles according to a comparative example.

As described above, lithium transition metal composite oxide particles having a composition represented by the formula: $Li_{1.2}Ni_{0.5}Mn_{1.425}Ti_{0.075}O_4$, and having a $D_{SEM}$ of 1.3 μm, a $D_5$ of 1.9 μm, a $D_{10}$ of 2.3 μm, a $D_{50}$ of 3.4 μm, a $D_{90}$ of 4.7 μm, a $D_{95}$ of 5 μm, a ratio of $D_{50}/D_{SEM}$ of 2.7, a ratio of $D_{90}/D_{10}$ of 2, and a ratio of $D_{95}/D_5$ of 2.6 were obtained. The physical properties of the lithium transition metal composite oxide particles are shown in Table 1, and an SEM image is shown in FIG. 5.

Comparative Example 4

Under the same conditions as in Examples 2 up to the crystallization step, composite oxide particles were obtained. The composite oxide particles were heat-treated in an air atmosphere at 1100° C. for 6 hours to obtain heat-treated composite oxide particles. The composite oxide particles were disintegrated, subjected once to dissociating treatment using a jet mill adjusted to a supply pressure of 0.55 MPa and a dissociating pressure of 0.55 MPa, and dry-sieved to obtain composite oxide particles that have undergone dissociating treatment and having a $D_{10}$ of 2.5 μm, a $D_{50}$ of 3.8 μm, a $D_{90}$ of 5.7 μm, and a $D_{90}/D_{10}$ of 2.3. The resultant composite oxide particles that have undergone dissociating treatment, lithium carbonate, and titanium oxide were mixed in a manner to have a ratio of Li:(Ni+Mn):Ti=1.2:1.925:0.075 to obtain a raw material mixture. The raw material mixture was heat-treated in an air atmosphere at 1000° C. for 11 hours, and then at 600° C. for 4 hours to obtain a sintered body. The sintered body was disintegrated, and subjected once to dissociating treatment using a jet mill adjusted to a supply pressure of 0.2 MPa and a dissociating pressure of 0.2 MPa so as not to pulverize its primary particles, and dry-sieved to obtain powder.

Figure 6:
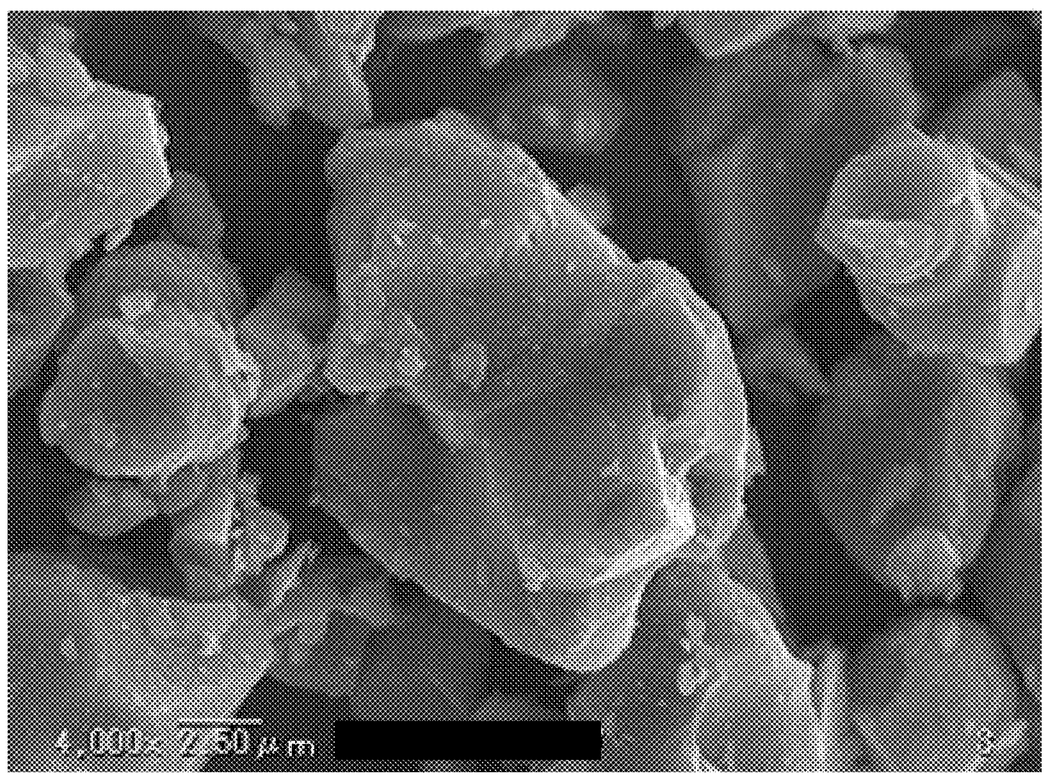
FIG. 6 is an exemplary SEM image of lithium transition metal composite oxide particles according to a comparative example.

As described above, lithium transition metal composite oxide particles having a composition represented by the formula: $Li_{1.2}Ni_{0.5}Mn_{1.425}Ti_{0.075}O_4$, and having a $D_{SEM}$ of 3.7 μm, a $D_5$ of 3.3 μm, a $D_{10}$ of 4.4 μm, a $D_{50}$ of 8.7 μm, a $D_{90}$ of 12.4 μm, and a $D_{95}$ of 14.8 μm, a $D_{50}/D_{SEM}$ of 2.4, and a $D_{90}/D_{10}$ of 2.8, and a $D_{95}/D_5$ of 4.5 were obtained. The physical properties of the lithium transition metal composite oxide particles are shown in Table 1, and an SEM image is shown in FIG. 6.

Example 3

Seed Generation Step

Into a reaction vessel, 30 kg of water was charged, and nitrogen gas was passed through the water with stirring, and the temperature within the vessel was set to 60° C. The oxygen concentration in the space within the vessel was maintained to 10% by volume or less, and then 922 g of a 25% by mol aqueous solution of sodium hydroxide was added to adjust the pH of the solution in the reaction vessel to 13.5 or more. A nickel sulfate solution and a manganese sulfate solution were mixed, and the aqueous mixture solution was adjusted to have nickel and manganese at a molar ratio of 26:74, and the total concentration of nickel and manganese ion is 1.7 mol/L.

To the solution in the reaction vessel, 4.76 L of the prepared aqueous mixture solution was added while stirring the mixture solution to obtain a liquid medium containing a seed crystal.

Crystallization Step

After the seed generation step, carbon dioxide was added until the pH becomes 9.1 while the temperature was maintained at 60° C. Subsequently, an aqueous mixture solution with 40 moles of solute, 84 moles of a 25% by mol aqueous solution of sodium hydroxide, and 43 moles of carbon dioxide were simultaneously added into the reaction vessel each at a constant flow rate over 90 min. The pH at this time was maintained to 7.5 to 8.5. After completion of the addition, a 25% by mass aqueous solution of sodium hydroxide was added until the pH within the reaction vessel becomes 9.8 with the reaction vessel being maintained at 60°

C. After the completion of dropping, a sample was taken. The resultant carbonate containing nickel and manganese had a $D_{50}$ of 4.6 μm.

The resultant product was then washed with water, and filtered to obtain composite carbonate particles. The composite carbonate particles were subjected to dry treatment in an air atmosphere at 300° C. for 10 hours to obtain composite oxide particles having a composition ratio of Ni/Mn=0.26/0.74, with $D_{10}$=3.2 μm, $D_{50}$=4.6 μm, $D_{90}$=6.4 μm, and $D_{90}/D_{10}$=3.4.

First Heat-Treating Step

The composite oxide particles were heat-treated in an air atmosphere at 950° C. for 6 hours to obtain a sintered body. The sintered body was disintegrated, subjected once to dissociating treatment using a jet mill adjusted to a supply pressure of 0.55 MPa and a dissociating pressure of 0.55 MPa, and dry-sieved to obtain a first heat-treated product with $D_{10}$=1.4 μm, $D_{50}$=2.6 μm, $D_{90}$=3.9 μm, and $D_{90}/D_{10}$=2.8.

The first heat-treated product, lithium carbonate, and titanium oxide were mixed in a manner to have a ratio of Li:(Ni+Mn):Ti=1.2:1.925:0.075 to obtain a raw material mixture. The raw material mixture was heat-treated in an air atmosphere at 800° C. for 11 hours, and then at 600° C. for 4 hours to obtain a sintered body. The sintered body was disintegrated, subjected once to dissociating treatment using a jet mill adjusted to a supply pressure of 0.2 MPa and a dissociating pressure of 0.2 MPa so as not to pulverize its primary particles, and dry-sieved to obtain powder.

Figure 7:
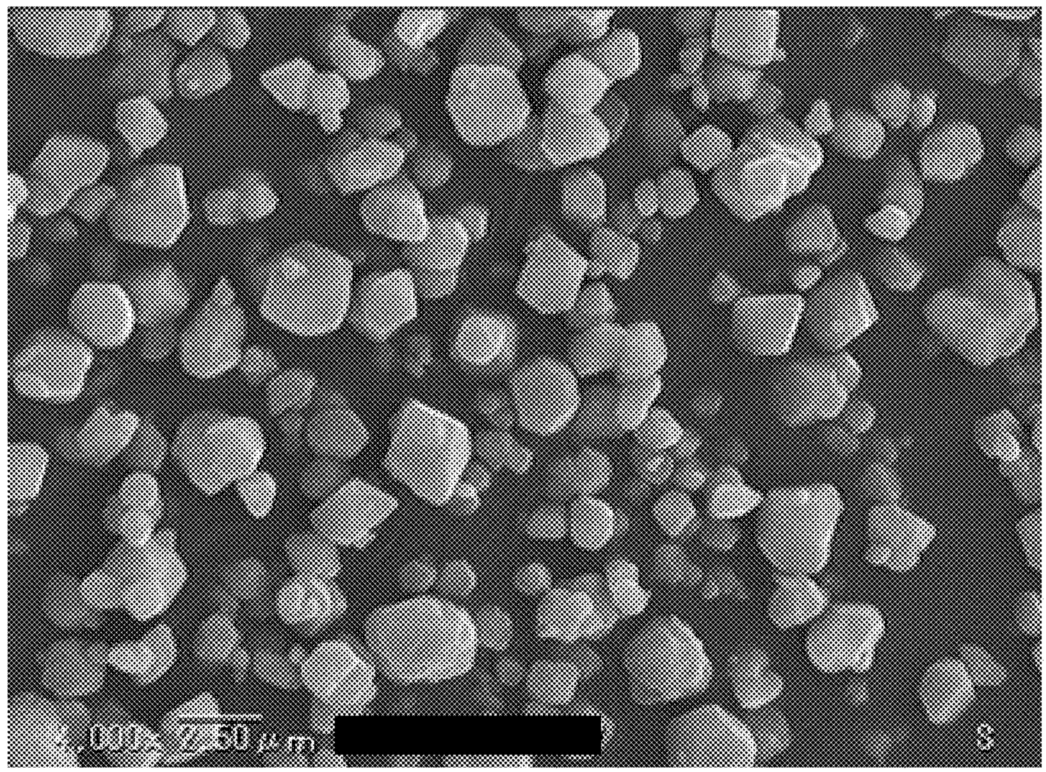
FIG. 7 is an exemplary SEM image of lithium transition metal composite oxide particles according to an embodiment.

As described above, lithium transition metal composite oxide particles were obtained. The particles have a composition represented by the formula: $Li_{1.2}Ni_{0.5}Mn_{1.425}Ti_{0.075}O_4$, and have a $D_{SEM}$ of 1.4 μm, a $D_5$ of 1.6 μm, a $D_{10}$ of 1.9 μm, a $D_{50}$ of 3 μm, a $D_{90}$ of 4.8 μm, a $D_{95}$ of 5.9 μm, a $D_{50}/D_{SEM}$ of 2.1, a $D_{90}/D_{10}$ of 2.5, and a $D_{95}/D_5$ of 3.8. The physical properties of the lithium transition metal composite oxide particles are shown in Table 1, and an SEM image is shown in FIG. 7.

Reference Example

Figure 8A:
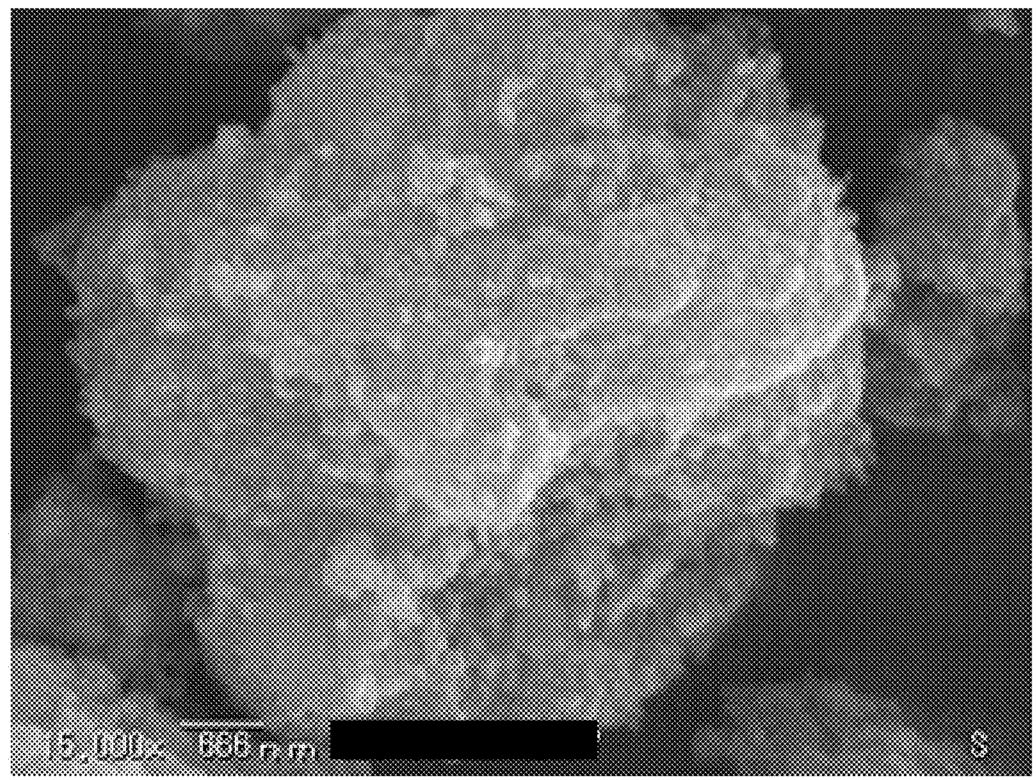
FIG. 8A is an exemplary SEM image of nickel manganese composite oxide particles having been heat-treated at 330° C.
Figure 8B:
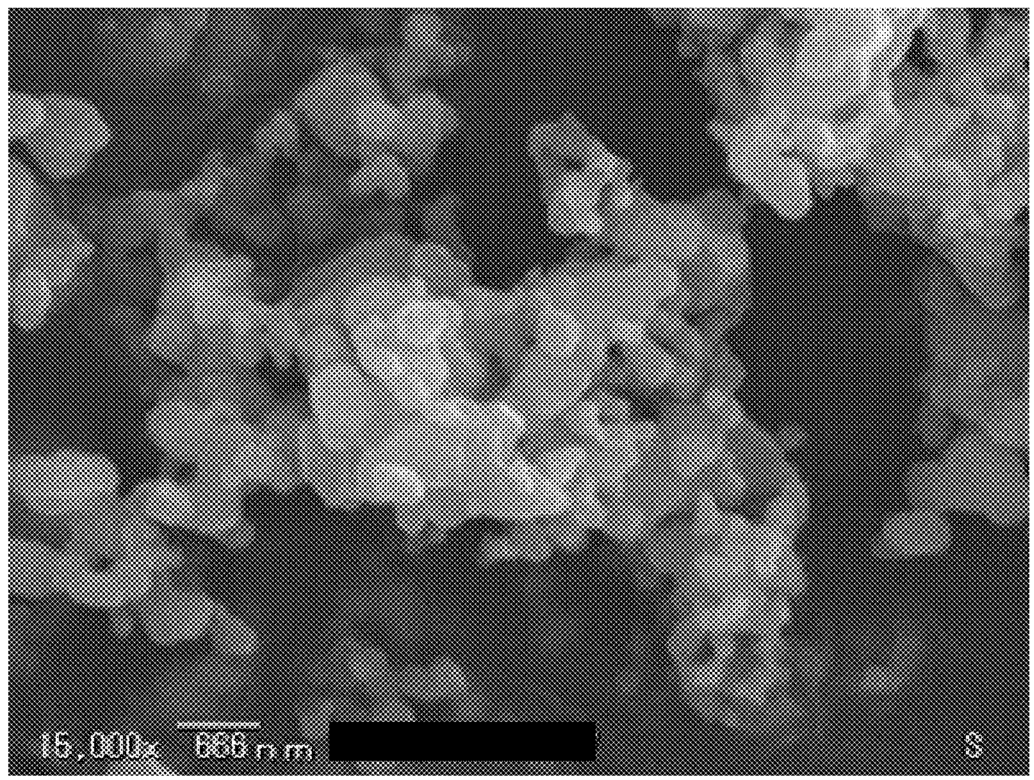
FIG. 8B is an exemplary SEM image of nickel manganese composite oxide particles having been heat-treated at 800° C.
Figure 8C:
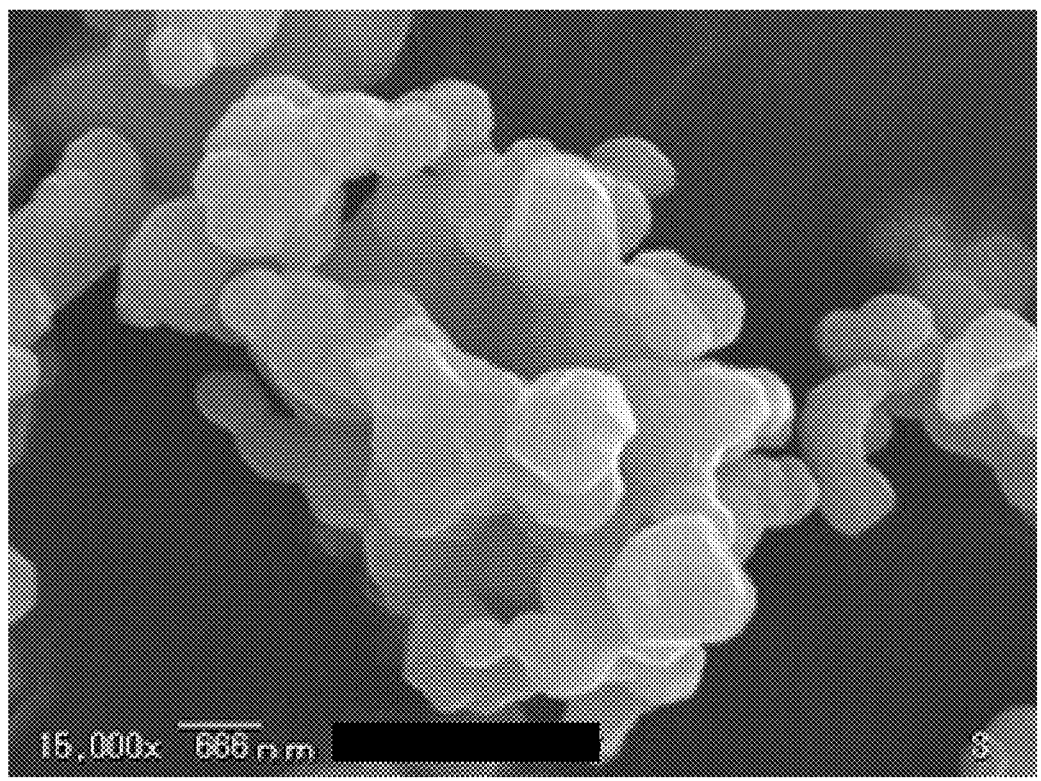
FIG. 8C is an exemplary SEM image of nickel manganese composite oxide particles having been heat-treated at 850° C.
Figure 8D:
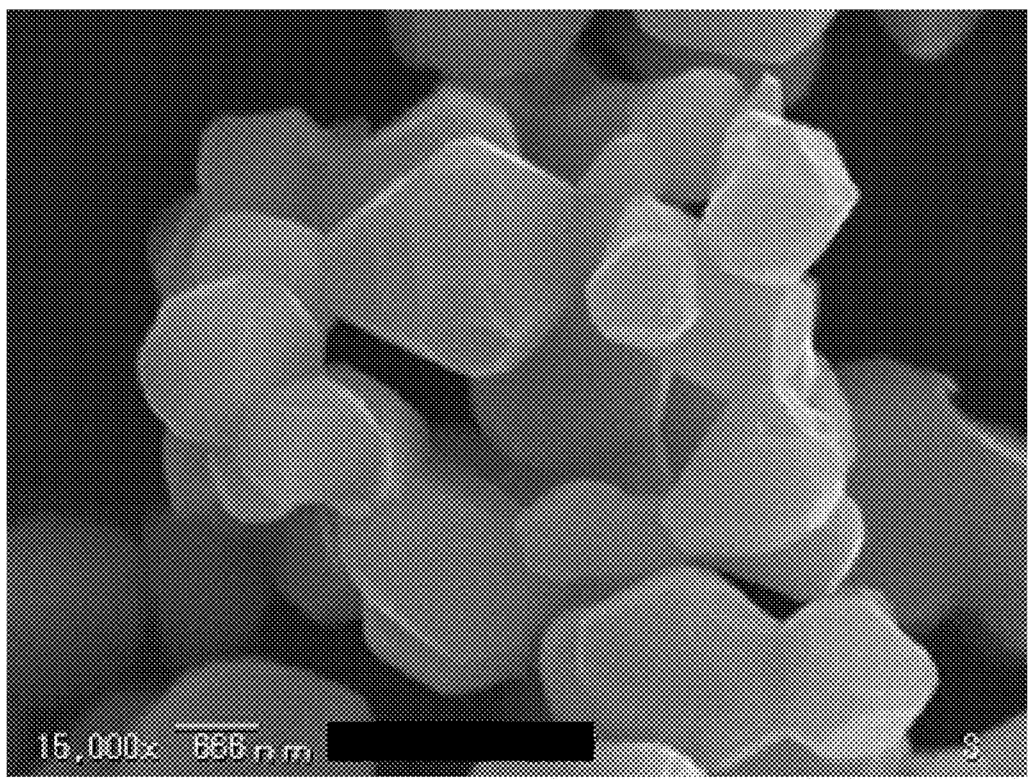
FIG. 8D is an exemplary SEM image of nickel manganese composite oxide particles having been heat-treated at 950° C.
Figure 8E:
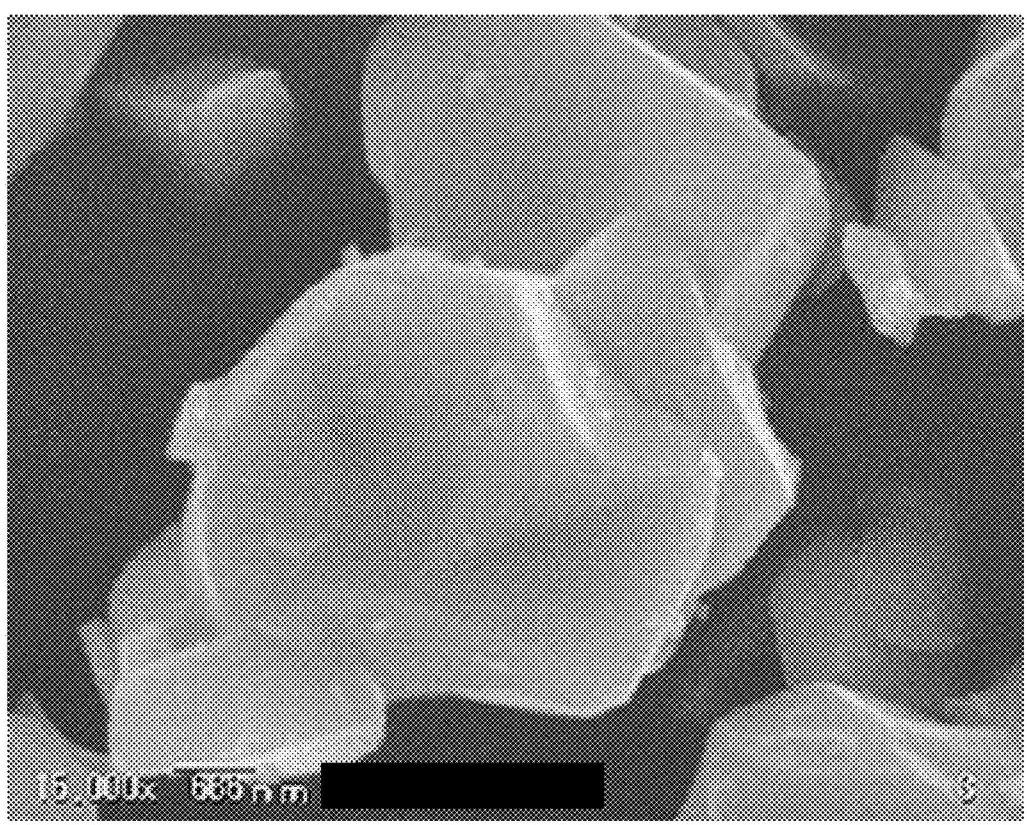
FIG. 8E is an exemplary SEM image of nickel manganese composite oxide particles having been heat-treated at 1100° C.

In the same manner as in the crystallization step of Examples 3, the composite oxide particles were heat-treated in an air atmosphere at 330° C., 800° C., 850° C., 950° C. or 1100° C. for 6 hours to obtain a sintered body. SEM images of the sintered body are shown in FIGS. 8A (330° C.), 8B (800° C.), 8C (850° C.), 8D (950° C.), and 8E (1100° C.).

Example 4

Nb Treatment Step

To 900 g of the lithium transition metal composite oxide particles obtained in Example 2, 106 g of Nb sol (a commercial Nb sol by Tagi Kagaku as the Nb source, Nb concentration: 4.2% by weight) was added dropwise with stirring with a mixer. Subsequently, the mixture was heat-treated in an air atmosphere at 350° C. for 9 hours to obtain lithium transition metal composite oxide particles that have undergone Nb treatment.

Example 5

In the same manner as in Example 4 except that the heat-treating temperature was changed to 700° C., lithium transition metal composite oxide particles that have undergone Nb treatment were obtained.

Comparative Example 5

In the same manner as Example 4 except that the lithium transition metal composite oxide particles obtained in Comparative Example 2 were used in place of the lithium transition metal composite oxide particles obtained in Example 2, lithium transition metal composite oxide particles that had undergone Nb treatment were obtained.

Comparative Example 6

In the same manner as in Comparative Example 5 except that the heat-treating temperature was changed to 700° C., lithium transition metal composite oxide particles that had undergone Nb treatment were obtained.

Evaluation

Using the respective lithium transition metal composite oxide particles obtained above as a positive-electrode active material, batteries for evaluation were prepared in the procedure described below.

Preparation of Positive electrode 90 parts by mass of the positive-electrode active material, 5 parts by mass of acetylene black, and 5 parts by mass of polyvinylidene fluoride (PVDF) were dispersed in an N-methyl-2-pyrrolidone (NMP) to prepare a positive electrode mixture. The positive electrode mixture was applied to an aluminum foil serving as a current collector, dried, and compression-molded with a roller press, and then cut into a predetermined size to prepare a positive electrode.

Preparation of Negative electrode 97.5 parts by mass of artificial graphite, 1.5 parts by mass of carboxymethylcellulose (CMC), and 1 part by mass of styrene-butadiene rubber (SBR) were dispersed in pure water, and dissolved to prepared a negative electrode slurry. The negative electrode slurry was applied to a current collector formed from copper coil, dried, and then compression-molded with a roller press, and then cut into a predetermined size to prepare a negative electrode.

Preparation of Batteries for Evaluation

The current collectors of each positive electrode and the negative electrode were each connected to a lead electrode, and then a separator was arranged between the positive electrode and the negative electrode, all of which were packed into a laminated pack or pouch. Subsequently, the laminated pack was vacuum-dried at 65° C. to remove moisture adsorbed onto the members. Under an argon atmosphere, an electrolyte was injected into each laminated pack, and sealed to prepare batteries for evaluation. For the electrolyte, ethylene carbonate (EC) and methyl ethyl carbonate (MEC) were mixed at a volume ratio of 3:7, into which lithium hexafluorophosphate ($LiPF_6$) was dissolved to have a concentration of 1 mol/L. The thus prepared batteries for evaluation were placed into a temperature controlled bath at 25° C., aged using a weak current, and then evaluated as described below.

Direct Current Internal Resistance Measurement

After aging, the batteries for evaluation were placed in an environment of 25° C. and −25° C., and the direct current internal resistance was measured. A constant current charging was carried out until a charge depth of 50% at a full charge voltage of 4.75 V. Pulse electric discharge was then carried out for 10 seconds with a specific current i, and the voltage V at the $10^{th}$ sec was measured. With current i on the horizontal axis and voltage V on the vertical axis, the points of intersection were plotted, and the slope of the straight line connecting the points of intersection was defined as a direct current internal resistance (DC-IR). At a temperature of 25° C., current i was 0.06 A, 0.11 A, 0.16 A, 0.21 A or 0.26 A, and at −25° C., current i was 0.03 A, 0.05 A, 0.08 A, 0.105 A or 0.13 A. A low DC-IR indicates good output characteristics. The results are shown in Table 1.

Durability

A charge and discharge cycle test was carried out under the temperature condition of 60° C. The test was carried out at a constant charge current 1 C (1 C=a current that completes electric discharge in 1 hour) with one cycle of charging to the upper-limit charge voltage of 4.75 V, and discharging to the lower-limit discharge voltage of 3.5 V at a constant current of 1 C. The cycle was repeated 100 times (100 cycles). At every cycle, the electric discharge volume was measured, and durability (%) was calculated using the formula: ($100^{th}$ cycle electric discharge volume/$1^{st}$ cycle electric discharge volume)×100. A high durability indicates that the battery has high lifetime characteristics. The results are shown in Tables 1 and 2. Table 2 shows the durability improved rate (%) of Examples 4 and 5 compared with Example 2, as well as durability improved rate (%) of Comparative Example 5 and 6 compared with Comparative Example 2.

TABLE 1

| | $D_{SEM}$ (μm) | $D_5$ (μm) | $D_{10}$ (μm) | $D_{50}$ (μm) | $D_{90}$ (μm) | $D_{95}$ (μm) | $D_{50}/D_{SEM}$ | $D_{90}/D_{10}$ | $D_{95}/D_5$ | Durability (%) | DC-IR (Ω) 25° C. | DC-IR (Ω) −25° C. |
|---|---|---|---|---|---|---|---|---|---|---|---|---|
| Example 1 | 2.4 | 2.5 | 2.7 | 3.8 | 5.4 | 6.3 | 1.6 | 2.0 | 2.5 | 66.5 | 1.2 | 7.6 |
| Comparative Example 1 | 1.5 | 2.8 | 3.4 | 6.2 | 10.5 | 13.7 | 4.2 | 3.1 | 4.9 | 62.6 | 1.1 | 7.8 |
| Example 2 | 2.6 | 2.3 | 2.7 | 4.2 | 6.0 | 6.4 | 1.6 | 2.2 | 2.8 | 74.1 | 1.1 | 7.0 |
| Comparative Example 2 | 1.9 | 2.8 | 3.4 | 6.1 | 9.8 | 12.4 | 3.3 | 2.9 | 4.5 | 73.4 | 1.0 | 6.5 |
| Comparative Example 3 | 1.3 | 1.9 | 2.3 | 3.4 | 4.7 | 5.0 | 2.7 | 2.0 | 2.6 | 66.8 | 1.2 | 7.2 |
| Comparative Example 4 | 3.7 | 3.3 | 4.4 | 8.7 | 12.4 | 14.8 | 2.4 | 2.8 | 4.5 | 72.6 | 1.2 | 9.3 |
| Example 3 | 1.4 | 1.6 | 1.9 | 3.0 | 4.8 | 5.9 | 2.1 | 2.5 | 3.8 | 76.4 | 1.1 | 6.7 |

TABLE 2

| | Durability (%) | Improved rate (%) |
|---|---|---|
| Example 2 | 74.1 | — |
| Example 4 | 78.3 | 4.2 |
| Example 5 | 80.2 | 6.1 |
| Comparative Example 2 | 73.4 | — |
| Comparative Example 5 | 77.1 | 3.7 |
| Comparative Example 6 | 78.3 | 4.9 |

Comparison between Example 1 and Comparative Example 1, which have a similar composition, and comparison between Example 2 and Comparative Examples 2 and 3, which have a similar composition, reveals that the lithium transition metal composite oxide particles that underwent the first heat-treating have a $D_{50}/D_{SEM}$ of 2.5 or less, achieving both improved durability and output characteristics. Although durability evaluation in Table 1 is based on a test of 100 charge and discharge cycles, if more charge and discharge cycles are repeated, further improvement in durability is rationally predicted because the value $D_{50}/D_{SEM}$ will become smaller, in other words, because of further reduction in boundary area. Comparison between Example 2 and Comparative Example 4 reveals that when $D_{SEM}$ is 3 μm or more, output characteristics deteriorate even when $D_{50}/D_{SEM}$ is 2.5 or less. Comparison between Example 2 and Example 3 reveals that composite oxide particles formed from carbonate have further improved durability and output characteristics.

Table 2 shows that when $D_{SEM}$ is less than 3 μm and $D_{50}/D_{SEM}$ is 2.5 or less, the improvement in characteristics resulting from niobium treatment will be even greater.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A positive-electrode active material for a non-aqueous electrolyte secondary battery, comprising:

lithium transition metal composite oxide particles having an average particle diameter based on SEM observation $D_{SEM}$ that is from 0.5 μm to less than 3 μm, and a ratio $D_{50}/D_{SEM}$ that is from 1.6 to 2.1 where $D_{50}$ is a particle diameter corresponding to 50% in its volume-based cumulative particle size distribution, wherein the lithium transition metal composite oxide particles have a spinel structure based on nickel and manganese, wherein the lithium transition metal composite oxide particles contain lithium transition metal composite oxide particles onto surfaces of which a substance containing niobium is adhered, wherein the lithium transition metal composite oxide particles have a ratio $D_{95}/D_5$ that is from 2.5 to 3.8, and wherein the lithium transition metal composite oxide particles have a ratio $D_{90}/D_{10}$ that is from 2.0 to 2.5.

2. The positive-electrode active material for a non-aqueous electrolyte secondary battery according to claim 1, wherein the lithium transition metal composite oxide particles comprises lithium transition metal composite oxide represented by the formula:

$$Li_xNi_pMn_qM^1_rO_4$$

wherein x, p, q, and r satisfy $1 \leq x \leq 1.3$, $0.3 \leq p \leq 0.6$, $1.2 \leq q \leq 1.7$, $0 \leq r \leq 0.2$, and $p+q+r \leq 2$, and $M^1$ is at least one selected from the group consisting of Al, Mg, Si, Ti, Cr, Fe, Co, Cu, Zn, Ga, and Nb.

3. The positive-electrode active material for a non-aqueous electrolyte secondary battery according to claim 1, wherein the $D_{SEM}$ of the lithium transition metal composite oxide particles is from 0.7 μm to 2.5 μm.

4. The positive-electrode active material for a non-aqueous electrolyte secondary battery according to claim 1, wherein the $D_{SEM}$ of the lithium transition metal composite oxide particles is from 1 μm to 2 μm.

5. The positive-electrode active material for a non-aqueous electrolyte secondary battery according to claim 1, wherein the ratio $D_{90}/D_{10}$ of the lithium transition metal composite oxide particles is from 2.0 to 2.3.

6. The positive-electrode active material for a non-aqueous electrolyte secondary battery according to claim 1, wherein the ratio $D_{95}/D_5$ of the lithium transition metal composite oxide particles is from 2.5 to 3.

7. The positive-electrode active material for a non-aqueous electrolyte secondary battery according to claim 1, wherein the $D_{SEM}$ of the lithium transition metal composite oxide particles is from 1 μm to less than 2 μm.

8. The positive-electrode active material for a non-aqueous electrolyte secondary battery according to claim 7, wherein the lithium transition metal composite oxide particles comprises lithium transition metal composite oxide represented by the formula:

$$Li_xNi_pMn_qM^1_rO_4$$

wherein x, p, q, and r satisfy $1 \leq x \leq 1.3$, $0.3 \leq p \leq 0.6$, $1.2 \leq q \leq 1.7$, $0 \leq r \leq 0.2$, and $p+q+r \leq 2$, and $M^1$ is at least one selected from the group consisting of Al, Mg, Si, Ti, Cr, Fe, Co, Cu, Zn, Ga, and Nb.

9. A electrode for a non-aqueous electrolyte secondary battery, comprising:

a current collector, positive electrode active material layer containing the positive-electrode active material for a non-aqueous electrolyte secondary battery according to claim 1 on the current collector.

10. A non-aqueous electrolyte secondary battery, comprising:

the positive electrode for a non-aqueous electrolyte secondary battery according to claim 9, a negative electrode for a non-aqueous electrolyte secondary battery, a non-aqueous electrolyte, and a separator.

* * * * *